(12) United States Patent
Weinman, Jr.

(10) Patent No.: US 7,933,586 B1
(45) Date of Patent: *Apr. 26, 2011

(54) SYSTEMS, METHODS AND DEVICES FOR RELIABLE ASYNCHRONOUS MESSAGE TRANSMISSIONS

(75) Inventor: Joseph Bernard Weinman, Jr., Basking Ridge, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 660 days.

This patent is subject to a terminal disclaimer.

(21) Appl. No.: 11/904,239

(22) Filed: Sep. 26, 2007

(51) Int. Cl.
*H04M 11/00* (2006.01)
(52) U.S. Cl. ..................... 455/412.1; 455/466
(58) Field of Classification Search .................. 455/413, 455/422.1, 466
See application file for complete search history.

(56) References Cited

U.S. PATENT DOCUMENTS

| | | | |
|---|---|---|---|
| 6,088,343 A | 7/2000 | King | |
| 6,757,712 B1 * | 6/2004 | Bastian et al. | 709/206 |
| 7,054,667 B2 | 5/2006 | Ketola | |
| 2002/0115429 A1 | 8/2002 | Deluca | |
| 2003/0035412 A1 | 2/2003 | Wang | |
| 2004/0203977 A1 | 10/2004 | Kennedy | |
| 2005/0245239 A1 | 11/2005 | Haumont | |
| 2005/0260985 A1 | 11/2005 | Rader | |

* cited by examiner

*Primary Examiner* — Creighton Smith
(74) *Attorney, Agent, or Firm* — Akerman Senterfitt; Michael K. Dixon

(57) ABSTRACT

A system and method composing, sending and receiving voicemail transmissions in an asynchronous manner is disclosed wherein mobile device users can compose and store audio messages in their respective local devices whereby the messages are subsequently forwarded to a network entity for eventual transmission to one or more destination devices.

20 Claims, 3 Drawing Sheets

US 7,933,586 B1

SYSTEMS, METHODS AND DEVICES FOR RELIABLE ASYNCHRONOUS MESSAGE TRANSMISSIONS

CROSS REFERENCE TO RELATED APPLICATIONS

N/A

BACKGROUND

Background of the Invention

The present invention relates to systems, methods and devices for mobile communications and more specifically to systems, methods and devices for facilitating asynchronous message communications.

In response to an ever increasingly mobile society, device manufacturers and communication service providers are offering many different types of telecommunication device and service options to their customers. With the increasing popularity of wireless communication systems such as wireless telephone systems, wireless personal communication systems, and related paging systems, such devices and services allow users of wireless communication devices (e.g. mobile telephones, mobile data devices, personal digital assistants (PDA) or paging receivers) to manage their availability for communication.

These wireless devices are particularly useful for live two-way communications when at least one party is untethered, e.g., driving in a car or at a remote location. In addition, these devices may be used for what may be termed "asynchronous communications" which may typically be one-way or half-duplex, such as when someone uses a cell phone to leave a voice-mail for another party or parties. Some prior art systems and methods may even be used to schedule future delivery of a voice message, even to a recipient that may not have a voice mail service but only a "POTS," or so-called Plain Old Telephone Service phone.

However, when a mobile device user is out of reach of their local receiving/transmitting facility such as a local base station, the device is unusable for communications. For example, scenarios that typically involve the loss of communicative abilities include traveling on airplanes, traveling on a cruise ship, driving through a cellular area with no or poor reception, or the like. When faced with a lack of service, a user would need to wait until the device is in range of a base station to begin generating and sending messages. Even in the case where there are on-board communications capabilities, such as ship-to-shore communications, or air-to-ground communications, such as the AirPhone service available from Verizon Communications of New York, N.Y., they are typically cost prohibitive. Moreover, these devices do not integrate with data typically contained within the mobile device, such as called party phone numbers.

Similarly, consider a situation such as a user with a cell phone driving through an area with spotty reception. The user may start leaving a message, only to lose reception. The user would then be unsure of whether the message was fully received, whether it was garbled, and so forth.

Additionally, consider a cell phone or other mobile device user desirous of receiving messages from their voice mail. Again, spotty reception, or no reception, would preclude them from being able to acquire or review these messages, except when in range of a base station, cell site, or the like.

Furthermore, consider scenarios where a user is desirous of delivering a message to multiple recipients, possibly on different networks. This message must be individually addressed, created, and sent to each recipient in turn.

Therefore, in view of the above, it would be desirable to have a reliable way of asynchronously composing, transmitting and receiving messages so that the messages may be created or reviewed without the typical constraints imposed by the services and devices currently available in the marketplace.

BRIEF SUMMARY OF THE INVENTION

The present invention relates to systems, methods and devices for capturing, composing, sending receiving, and reviewing asynchronous message transmissions. In the present invention, a local memory in a mobile device is used to record one or more audio messages, each of which may be ultimately destined for one or more recipients. During initial and possibly multiple re-contacts with a receiving and transmitting facility such as a base station, the messages and their header information are uploaded incrementally to the facility for delivery to the one or more recipients. Simultaneously, such messages may be downloaded from a base station into the mobile device, for current or subsequent review. Based on user preference or predetermined rules, messages may be deleted from their origination point once successfully copied to their destination.

In one embodiment, the present invention is a method comprising capturing at least one audio message at a mobile device, storing at least part of the at least one audio message in the mobile device, and then in a delayed, intermittent, or contiguous fashion transmitting the at least one audio message from the mobile device to a network and delivering the at least one audio message from the network to at least one recipient.

In another embodiment, the present invention is a method for reliably transmitting audio messages comprising intermittently or contiguously receiving one or more audio messages from a network, the one or more messages originating from one or more originating personal conununication devices or automated communication systems and forwarding the one or more audio messages from the network to a mobile device wherein the one or more messages are stored and played back at the mobile device.

In a further embodiment, the present invention is a mobile device comprising a capture module for capturing and digitizing audio messages, an audio message memory for storing the audio messages and a mobile transmission module for forwarding the stored audio messages to the network wherein forwarding may be performed in an intermittent fashion based upon current transmission conditions.

DETAILED DESCRIPTION OF THE INVENTION

Figure 1:
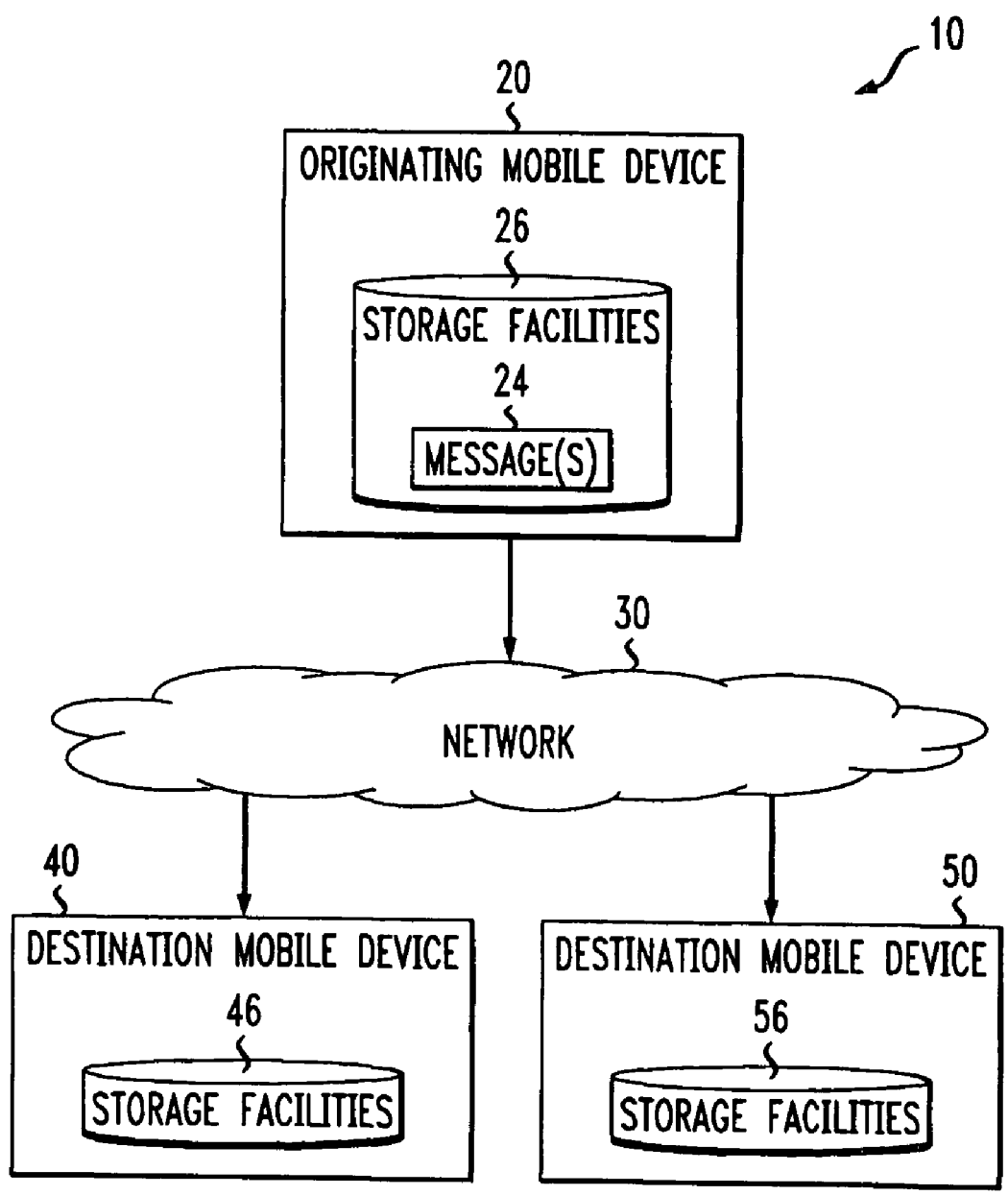
FIG. 1 illustrates an overview of an embodiment of a system of the disclosed invention.

The present invention relates to systems, methods and devices for composing, sending and receiving reliable asynchronous message transmissions. Referring to FIG. 1, an overview of a system 10 for composing, sending and receiving such asynchronous voicemail transmissions is shown. In this embodiment, system 10 includes at least one originating mobile device 20 where one or more messages (i.e. voice-mails) may be composed in an asynchronous manner. In one exemplary operative scenario, one or more messages 24 are composed in an asynchronous manner on originating mobile device 20 and are sent to a communication network 30 for eventual delivery to one or more destination mobile devices 46 and 50 where the messages) may be played back. In another exemplary operative scenario, destination mobile devices 40 and 50 may download messages from communication network 30 for review in an asynchronous manner. As discussed in more detail later herein, the originating mobile device(s) and destination mobile device(s) utilize local storage facilities such as storage facilities 26, 46 and 56 for the storage of both outbound and inbound messages.

In the present invention, communication network 30 generally provides interconnection utilizing various interconnection architectures including a variety of wireless based networks, Internet Protocol (IP) based networks such as the Internet, the public switched telephone network (PSTN), ATM networks, signaling networks, satellite networks, fixed wireless networks, DSL networks as well as other systems. Network 30 provides versatile intelligent conduits that may carry, for example, communication signals, data signals, Internet Protocol (IP) telephony based signal and other multimedia signals.

In the present invention, communications between the mobile devices and the communications network are enabled by a variety of networks, protocols and standards including, but not limited to CDMA (Code Division Multiple Access), TDMA (Time Division Multiple Access), AMPS (Advanced Mobile Phone System), GSM (Global System for Mobile communications), GPRS (General Packet Radio Service), 2.5G, 3G, EDGE (Enhanced Data for GSM Evolution), IEEE 802.11x, 1XRTT, WCDMA (Wideband CDMA), and so forth and other related networks, protocols and standards. As used herein, the network described herein may include base stations, regional stations, central stations and transmitters that are interconnected by landline trunks, base stations, satellites, antennas, routers, bridges and wireless connections to facilitate the necessary connections to establish the communications described herein.

Figure 2:
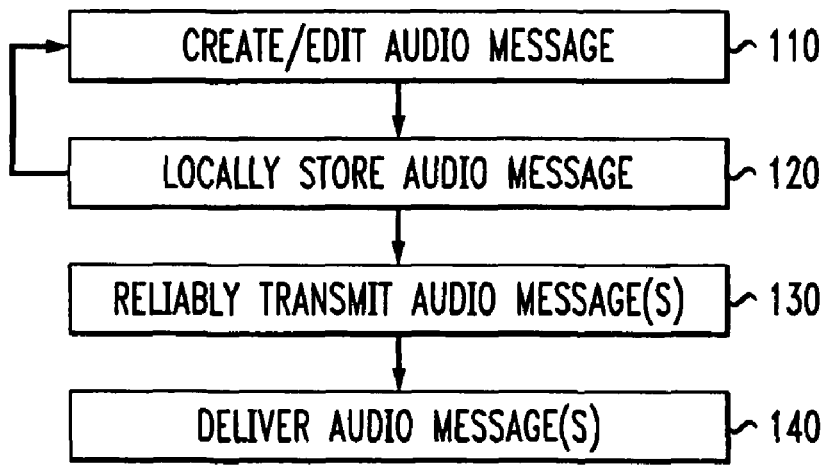
FIG. 2 illustrates an embodiment of a method of the disclosed invention for creating and uploading messages.

Referring now to FIG. 2, one embodiment of a method of the instant invention is shown. In step 110, the user creates an audio message. Such an audio message is typically a voice message, but could also include generalized audio such as music or ambient sounds. For example, an exemplary message could include some speech by the user as well as some desirable environmental sounds or noise. In one embodiment, step 110 may include a number of substeps, e.g., recording the message, any signal conversion such as from an analog signal from a microphone to a digital format suitable for network transmission, reviewing it, deleting it, re-recording it, editing it, and the like. In addition, header information, or meta-data may also be created, or associated with the message, e.g., addressing it to one or more recipients (typically phone numbers), creating an index key or name for it, marking an urgency, time-stamping it, creating and associating a unique message identifier, and the like.

Referring still to FIG. 2, in step 120, the message and any header information are stored, in accordance with the principles of the instant invention, in a local memory or storage facility. Steps 110 and 120 may be repeated as necessary, either as new messages are created, or as the audio portion or meta-data of the message are modified. Thus a multitude of messages may be created or composed and then stored in the local storage facility.

Referring again to FIG. 2, in step 130, a possibly intermittent connection is monitored for connection quality, signal strength, or the like, and the one or more messages which are in the local storage facility are reliably transmitted to one or more edge devices or base stations of the communication network. Such edge devices may have an intermittent connection with the mobile device, and consequently such messages, or components thereof may require one or more retransmissions in order for the message(s) to be reliably delivered to a server or switch adjunct or the like connected to the base stations. Techniques for ensuring reliable message transmission over unreliable connections and elements thereof such as error detection, forward error correction, reliable session layers, packetization, datagram delivery, and the like may be utilized herein.

In one exemplary embodiment, one such mechanism for ensuring reliable message transmission is represented by the following pseudo-code as follows:

In the mobile transmitter:

```
For each Message M:
    Divide Message M into Packets numbered 1 to n;
    For Each I, I=1 to n
        Transmit Packet M(I), together with message identifier
            M, packet sequence number I, total packet count
            n, and error detection/correction code such as
            cyclic redundancy checksum
        Receive Acknowledgement A (asynchronously)
        While Not (Acknowledgement A = "M(I of n) Received
            Successfully") Do Retransmit M(I);
            Receive Acknowledgement A (asynchronously)
        End While
    Next I
Next Message
```

In the base station receiver:

```
For each Message M:
    While All Message Packets Not Yet Received
        Attempt Packet Reception
        If packet M(I of n) Successfully Received Then
            Transmit Acknowledgement("M(I of n) Received
                Successfully")
        End If
    End While
    Reassemble M from All Packets
Next Message
```

Each of the above pseudo-code routines in turn invokes other subroutines in either software, firmware, or hardware, e.g., packet error detection using cyclic redundant checksums.

In another exemplary embodiment, another such mechanism for ensuring reliable message transmission is represented by the following pseudo-code as follows:

In the mobile transmitter:

```
Main Routine:
    Divide All Messages to be Sent into Packets P(m,l)
    Mark All Packets P(m,l) as Unsent
    Parallel Begin
        Do CoRoutine SendUnacknowledgedPackets
```

```
        Do CoRoutine ReceiveAcknowledgements
    Parallel End
End Main
Co-Routine SendUnacknowledgedPackets
    While There are Unacknowledged Packets
        Transmit a Packet
    End While
End Co-Routine
Co-Routine ReceiveAcknowledgements
    While There are Unacknowledged Packets
        Receive Acknowledgement for Packet P(x,y)
        Mark Packet P(x,y) as Acknowledged
    End While
End Co-Routine
```

Optionally and advantageously, messages may either be deleted upon successful reception at the base station, or maintained in the local store until space is required, but marked as successfully and completely sent and received by the base station. Many variations of step 130 are in the scope of the instant invention. For example, a single message may have to be completely sent before the next one is even initially attempted, they may be sent in sequential order or based on priority markings, and so forth.

Finally, with reference still to FIG. 2, in step 140, the message is forwarded to its ultimate destination. For each (one or more) recipient identified in the header information, the message is delivered. This delivery may occur over one or more networks, using one or more technologies/protocols as discussed earlier herein such as via POTS, voicemail, Voice over IP, wireless transmission, TDM, etc.

It is worth noting that the steps shown in FIG. 2 and described herein may occur sequentially, i.e., create the message, store the message, transmit the message, and then deliver the message. Or, they may occur in overlapping fashion, where message delivery, even to a live user actively listening to the message may have begun even as the message is being created and stored. Advantageously, this means that buffering and reliable message delivery can be used to provide robust communications even over connections of intermittent quality. Also, these steps may be conducted in parallel with other activities, e.g., messages may be uploaded even while the user is conducting a live conversation, either on control channels or in conversational interstices when both speakers have paused momentarily.

Figure 3:
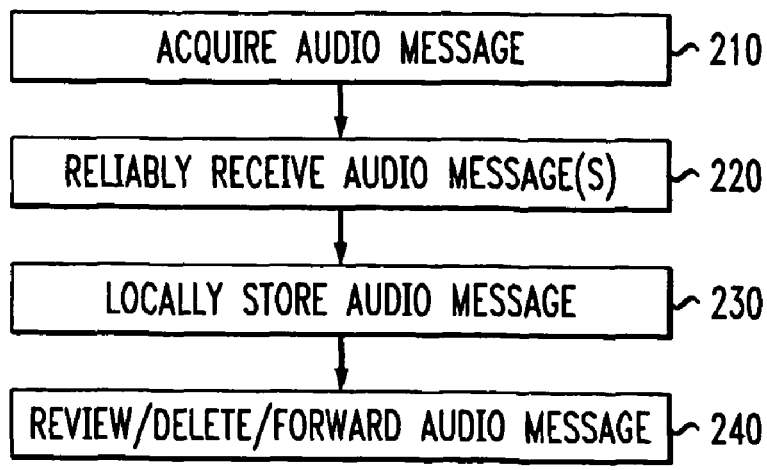
FIG. 3 illustrates an embodiment of a method of the disclosed invention for downloading and reviewing messages.

Referring now to FIG. 3, another embodiment of a method of the present invention is shown. In this embodiment, audio messages existing in the network are delivered by one or more base stations to the local store or repository of a mobile device. In step 210, one or more messages are acquired from one or more sources, such as voicemail by a subsystem associated with the base station. In step 220, the one or more messages are transmitted by one or more transmitters at one or more base stations, and the messages are reliably received by the mobile device. In step 230, the one or more audio messages are entered into and maintained by the local store. In step 240, the audio messages are reviewed. Other steps, not shown, may exist, e.g., to delete messages which have been listened to. As described above, these steps may be conducted sequentially or in overlapping fashion.

Figure 4:
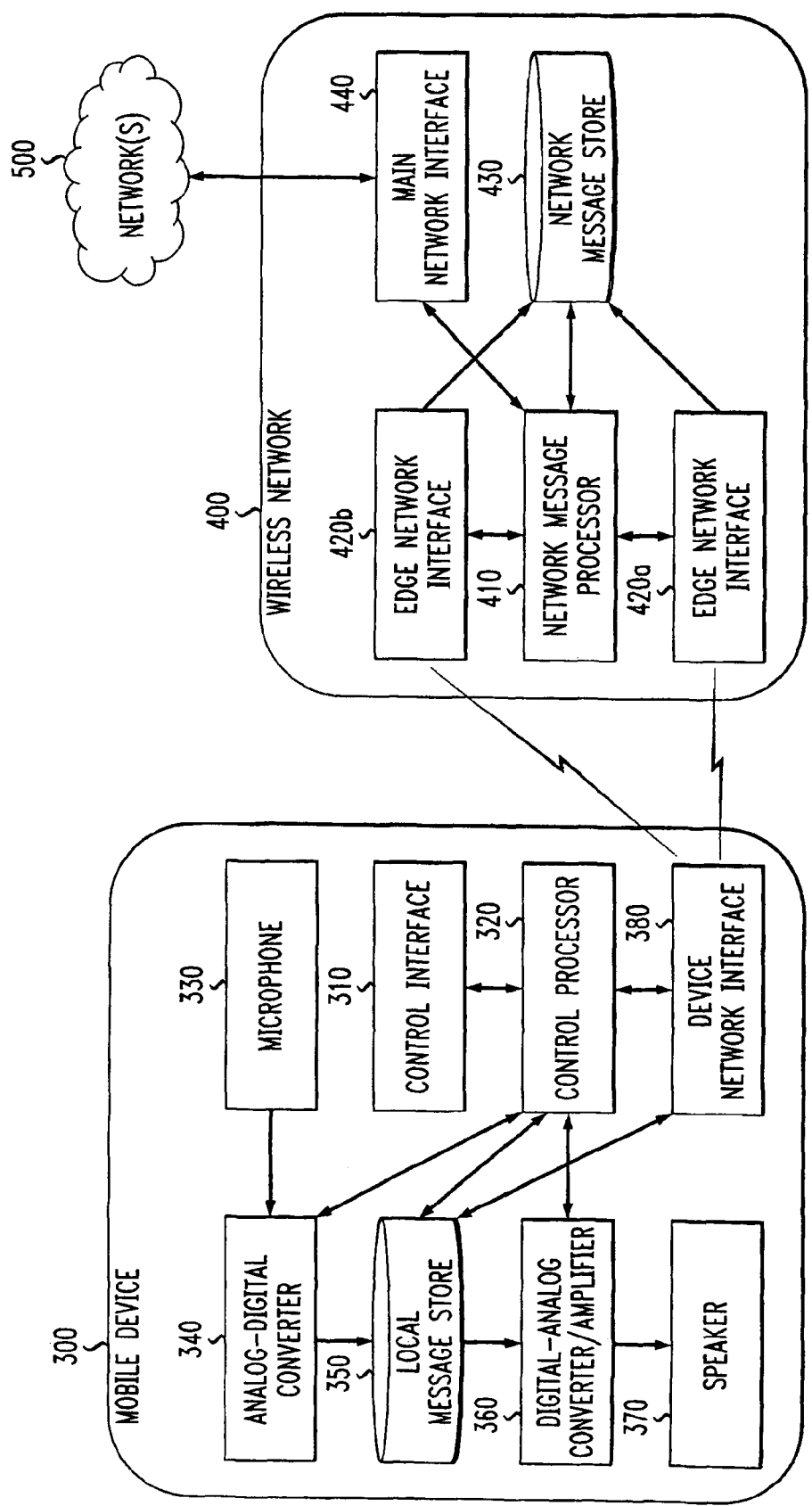
FIG. 4 illustrates an embodiment of a system of the disclosed invention.

FIG. 4 illustrates an embodiment of a system for implementing the principles of the instant invention. In this embodiment, a mobile device 300 cooperates with a wireless network 400 to deliver and acquire messages to recipients and from senders across one or more network(s) 500.

With reference to FIG. 4, mobile device 300, such as a cell phone, two-way voice enabled PDA or the like, may include a control interface 310, a control processor 320, a microphone 330, an analog-to-digital converter 340, a local message store 350, a digital-to-analog converter 360, a speaker 370 and a device network interface 380. Mobile device 300 may also include additional components such as an antenna (not shown), a power supply (not shown) and/or battery (not shown), a housing (not shown), a headset connection (not shown), a headset (not shown) and a unique device identifier such as an International Mobile Equipment Identifier or Electronic Serial Number (ESN) typically embedded in a chip (not shown), and the like.

Wireless network 400 may include one or more edge network interfaces 420*x*, shown here for ease of illustration as 420*a* and 420*b*, but it is contemplated that the actual number may be greater or lesser than shown here. Wireless network 400 may also include a network message processor 410, a network message store 430, and a main network interface 440.

With reference to FIG. 4, a mobile user will record an audio message which may include voice, music, sounds, and the like, using microphone 330. This message is converted to digital form by analog-to-digital converter 340, and stored in local message store 350, typically with additional metadata such as message length, creation date/time, and the like. Using control interface 310, which may comprise one or more keys, a visual display, knobs, buttons, switches, and the like, the user may then review the message, edit it, forward it, delete it prior to sending, receive messages from the network, listen to them, delete them prior to, during, or after review, set preferences for automatic deletion upon successful transmittal, and so forth. Also, control interface 310 may be used to toggle between different modes of operation, e.g., power off, power on and mobile device active but offline (i.e., neither receiving nor transmitting), and power on and mobile device active and online. The offline mode may be used, e.g., to record or listen to messages when in an environment where transmission is prohibited, e.g., when flying, or not desired, e.g., the user wants to create a message without being disturbed by incoming calls. Also, the user enters one or more destination addresses, e.g., typically recipient phone numbers but possibly email addresses, screen names, or the like. The control processor 320, which is typically a combination of software, firmware, and/or hardware, interprets the commands, and interacts with the analog-to-digital converter 340, local message store 350, and digital-to-analog converter/amplifier 360 to record, edit, playback, attach addressing information, and the like. Local message store 350 allocates bytes or blocks of memory to the digitized audio message, metadata, and store information, such as which bytes or blocks are allocated and/or free. For reviewing created or received messages, control interface 310 cooperates with control processor 320, digital-to-analog amplifier 360, and speaker 370 to convert stored digital audio information in local message store 350 to audible sounds.

Referring still to FIG. 4, device network interface 380 implements logic for interacting with one or more base stations or edge devices, such as edge network interface(s) 420*x*, e.g., 420*a*, 420*b*, and so forth. Communication may be via one or more channels, e.g., a control channel and a paired transmit channel and receive channel. In one embodiment, the channels are digital, but the channels may be a mix of analog and digital, and may use any of a variety of wireless protocols as discussed earlier herein. In an exemplary mode of operation, device network interface 380 broadcasts or otherwise announces the presence of mobile device 300, homes on an edge network interface 420*x*, establishes a viable connection, transmits and/or receives packets and metadata or channel control information, and the like.

Still with reference to FIG. 4, network message processor 410 maintains a session with mobile device 300 via edge network interface(s) 420. One session involving transmitting or receiving multiple messages may only utilize one edge network interface 420, e.g., when a user has just landed, and uploads or receives messages as they wait for their luggage. Alternatively, multiple edge network interfaces 420 may be adjacent, e.g., when a user, after flying into an airport with a half an hour worth of messages to transmit, drives across multiple cell sites as they upload the messages. Or, use of multiple edge network interfaces 420 may be widely dispersed in space and time, even when uploading or receiving one message. For example, a user may begin to upload a message in a first location and then complete the uploading at a later time at a second location where the second location may be geographically removed from the first location. In a more specific example, uploading may begin by a user in a first city and then uploading may be completed at a later time in a different city, with such a scenario being encountered during conventional air travel, which takes the user from one locale to another distant locale.

Network message processor 410 provides message and session continuity across these multiple intermittent links, reliably acquiring packets or parts of messages and associated metadata and placing them in the network message store 430, and/or reliably sending packets or parts of messages and associated metadata based on messages contained in network message store 430 for the destination mobile device 300, and then eventually marking them as fully received or transmitted and notifying the mobile device 300 accordingly.

Still with reference to FIG. 4, when uploading messages for delivery, when network message store 430 has a complete message and associated metadata, main network interface 440 cooperates with one or more networks 500 to deliver the message. This may involve setting up one or more circuit switched calls to destination called parties, based on metadata such as phone number, leaving voice mails for the parties in voicemail systems, sending digitized audio files such as wave files to the parties based on metadata such as an email address, setting up a Voice-over-IP call, or the like. Conversely, main network interface 440 may receive messages from one or more network(s) 500, which may be circuit switched or packet switched networks, together with information such as recipient telephone number, sender email address or telephone number, and the like.

It should be noted that the time to transmit or receive a message may be less than, the same as, or greater than the actual duration of the message. For example, the message may be compressed using data compression techniques as are known in the art to eliminate pauses or "white space," as well as to speed delivery. Conversely, if multiple connections must be established with one or more base stations, and significant retransmission must occur, the actual connect time (as well as the passage of real time) to transmit a message may be greater than the duration of the actual message itself.

While the present invention has been described with reference to preferred and exemplary embodiments, it will be understood by those of ordinary skill in the art that various changes may be made and equivalents may be substituted for elements thereof without departing from the scope of the invention. In addition, many modifications may be made to adapt a particular device, situation or step to the teachings of the invention without departing from the scope thereof. Therefore, it is intended that the invention not be limited to the particular embodiment disclosed, but that the invention will include all embodiments falling within the scope of the appended claims.

What is claimed is:

1. A method for reliably transmitting audio messages comprising:
based upon current transmission conditions, intermittently transmitting at least one audio messages from a mobile device to a network, the at least one audio messages destined for a recipient, the at least one audio messages previously received and stored at the mobile device.

2. The method of claim 1 wherein:
the at least one audio messages are part of a voicemail network.

3. The method of claim 1 wherein:
the at least one audio messages include environmental noise.

4. The method of claim 1 wherein:
the network includes at least one base station.

5. The method of claim 1 wherein:
the mobile device is selected from a wireless-enabled personal digital assistant and a wireless telephone.

6. The method of claim 1 wherein:
the at least one audio messages contain identification information associated with the mobile device.

7. A method comprising:
based upon current transmission conditions, intermittently forwarding stored audio messages from a mobile device to a network.

8. The method of claim 7, wherein:
the mobile device is a cellular mobile phone having a flash memory module.

9. The method of claim 7, wherein:
the mobile device is a wireless-enabled personal digital assistant.

10. The method of claim 7, further comprising:
receiving a locally unstored audio message.

11. The method of claim 7, further comprising:
digitizing a received audio message.

12. The method of claim 7, further comprising:
playing on the mobile device a stored audio message from the stored audio messages.

13. The method of claim 7, wherein:
the stored audio messages are part of a voicemail network.

14. The method of claim 7, wherein:
at least one of the stored audio messages includes environmental noise.

15. The method of claim 7, wherein:
the network includes at least one base station.

16. The method of claim 7, wherein:
the mobile device is a wireless-enabled personal digital assistant.

17. The method of claim 7, wherein:
the mobile device is a wireless telephone.

18. The method of claim 7, wherein:
at least one of the stored audio messages contain identification information associated with the mobile device.

19. A processor-readable medium comprising processor commands for activities comprising:
based upon current transmission conditions, intermittently forwarding stored audio messages from a mobile device to a network.

20. A system comprising:
a mobile devised adapted to, based upon current transmission conditions, intermittently forwarding stored audio messages from the mobile device to a network.

* * * * *